US011562109B2

(12) United States Patent
Negishi (10) Patent No.: US 11,562,109 B2
(45) Date of Patent: Jan. 24, 2023

(54) COMPUTER-READABLE RECORDING MEDIUM STORING STRUCTURAL ANALYSIS SIMULATION PROGRAM, STRUCTURAL ANALYSIS SIMULATION METHOD, AND INFORMATION PROCESSING DEVICE

(71) Applicant: FUJITSU LIMITED, Kawasaki (JP)

(72) Inventor: Takanori Negishi, Nagano (JP)

(73) Assignee: FUJITSU LIMITED, Kawasaki (JP)

( * ) Notice: Subject to any disclaimer, the term of this patent is extended or adjusted under 35 U.S.C. 154(b) by 1002 days.

(21) Appl. No.: 16/266,205

(22) Filed: Feb. 4, 2019

(65) Prior Publication Data
US 2019/0272351 A1 Sep. 5, 2019

(30) Foreign Application Priority Data
Mar. 5, 2018 (JP) .............................. JP2018-038153

(51) Int. Cl.
*G06F 30/20* (2020.01)
*G06F 111/20* (2020.01)

(52) U.S. Cl.
CPC .......... *G06F 30/20* (2020.01); *G06F 2111/20* (2020.01)

(58) Field of Classification Search
CPC ............................ G06F 30/20; G06F 2111/20
See application file for complete search history.

(56) References Cited

U.S. PATENT DOCUMENTS

| 2003/0055612 | A1* | 3/2003 | Amakai ................. G06F 30/23 703/1 |
| 2005/0078870 | A1 | 4/2005 | Iwase |
| 2007/0225953 | A1 | 9/2007 | Uchida et al. |
| 2008/0010041 | A1* | 1/2008 | McDaniel .............. G06F 30/00 703/1 |

(Continued)

FOREIGN PATENT DOCUMENTS

| JP | 09-138812 | 5/1997 |
| JP | 2003-006240 | 1/2003 |

(Continued)

OTHER PUBLICATIONS

Chen X, Gao S, Guo S, Bai J. A flexible assembly retrieval approach for model reuse. Computer-Aided Design. Jun. 1, 2012; 44(6): 554-74. (Year: 2012).*

(Continued)

*Primary Examiner* — Chuen-Meei Gan
(74) *Attorney, Agent, or Firm* — Fujitsu Patent Center (57) ABSTRACT

A non-transitory computer-readable recording medium stores therein a program for causing a computer to execute a process for reading design data from a memory which stores the design data that indicates an auxiliary geometric shape and an article, the auxiliary geometric shape being arranged in association with a setting portion for which a condition for performing simulation for structural analysis of the article is set, and being assigned identification information including the condition; identifying the auxiliary geometric shape and the condition from the design data based on the identification information; setting the condition for the setting portion; and performing the simulation based on the condition.

7 Claims, 9 Drawing Sheets

(56) References Cited

U.S. PATENT DOCUMENTS

2011/0050686 A1* 3/2011 Nojima .............. G06F 3/04815
                                                      345/419
2019/0179978 A1* 6/2019 Das ....................... G06F 30/17

FOREIGN PATENT DOCUMENTS

JP      2005-100166     4/2005
JP      2007-264724     10/2007

OTHER PUBLICATIONS

JPOA—Office Action of Japanese Patent Application No. 2018-038153 dated Nov. 30, 2021 with Machine Translation.
CNOA—Office Action of Chinese Patent Application No. 201910114227.1 dated Oct. 9, 2022 with English Translation.
**US2005078870A1 cited in the CNOA was previously submitted in the IDS filed on Dec. 9, 2021.

* cited by examiner

DIVIDE (CUT OUT) SOLID

COMPUTER-READABLE RECORDING MEDIUM STORING STRUCTURAL ANALYSIS SIMULATION PROGRAM, STRUCTURAL ANALYSIS SIMULATION METHOD, AND INFORMATION PROCESSING DEVICE

CROSS-REFERENCE TO RELATED APPLICATION

This application is based upon and claims the benefit of priority of the prior Japanese Patent Application No. 2018-38153, filed on Mar. 5, 2018, the entire contents of which are incorporated herein by reference.

FIELD

The embodiments discussed herein are related to a computer-readable recording medium storing a structural analysis simulation program, a structural analysis simulation method, and an information processing device.

BACKGROUND

In a known technique, in order to evaluate the performance, such as strength, anti-vibration, anti-heat, of an article to be designed, structural analysis of the article is performed on a computer based on design data corresponding to the article. When structural analysis is performed, a condition (such as a boundary condition) under which simulation for structural analysis is performed is set by a user input for an area of the article indicated by the design data. Subsequently, finite elements are generated by element division according to the geometric shape of the article and the purpose of analysis, and simulation is performed. A result of the simulation is then displayed on a display device.

In a related art technique, input request for an analysis condition for a portion of an article, in which the geometric shape of the article is changed, is displayed on a display to avoid neglecting to set an analysis condition (see, for instance, Japanese Laid-open Patent Publication No. 9-138812). In a related art technique, design data, and conditions for generating an analysis model, analysis conditions are managed in association with each other (see, for instance, Japanese Laid-open Patent Publication No. 2007-264724).

Related techniques are disclosed in, for example, Japanese Laid-open Patent Publication No. 2003-6240.

In a related art technique, various conditions including boundary conditions, such as a loading condition and a restriction condition, for performing simulation for structural analysis are set by a user, and thus there was a problem in that the structural analysis took a long time.

SUMMARY

According to an aspect of the embodiments, a non-transitory computer-readable recording medium stores therein a program for causing a computer to execute a process for reading design data from a memory which stores the design data that indicates an auxiliary geometric shape and an article, the auxiliary geometric shape being arranged in association with a setting portion for which a condition for performing simulation for structural analysis of the article is set, and being assigned identification information including the condition; identifying the auxiliary geometric shape and the condition from the design data based on the identification information; setting the condition for the setting portion; and performing the simulation based on the condition.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Hereinafter, an embodiment in the present disclosure will be described with reference to the drawings.

First Embodiment

Figure 1:
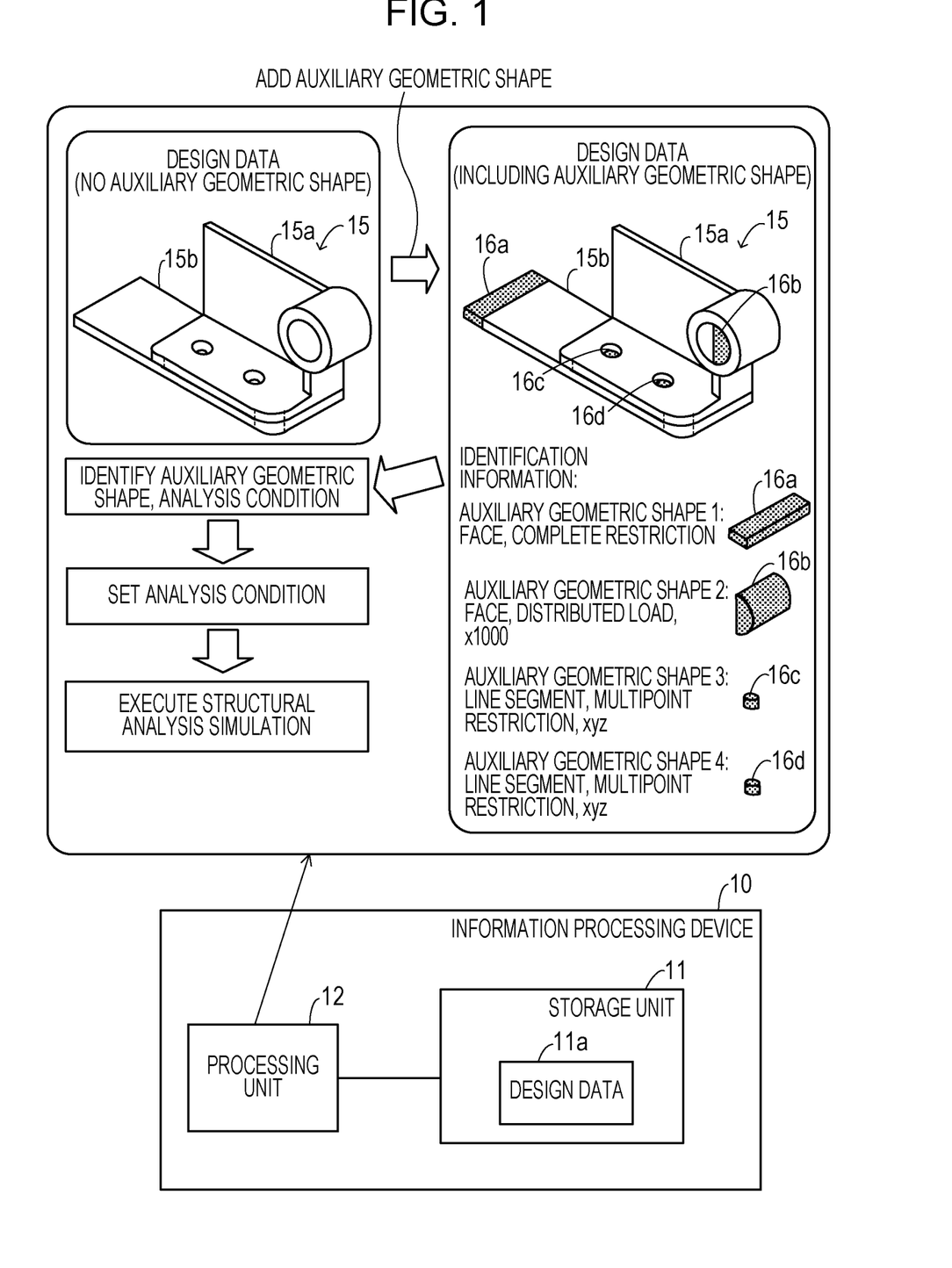
FIG. 1 is a diagram illustrating an example of an information processing device and a structural analysis simulation method of a first embodiment.

FIG. 1 is a diagram illustrating an example of an information processing device and a structural analysis simulation method of a first embodiment.

The information processing device 10 of the first embodiment performs structural analysis simulation of an article. The information processing device 10 may be a client computer or a server computer.

The information processing device 10 has a storage unit 11 and a processing unit 12.

The storage unit 11 is a volatile storage device, such as a random access memory (RAM), or a non-volatile storage device, such as a hard disk drive (HDD) and a flash memory. The storage unit 11 may be called a memory.

The storage unit 11 stores design data 11a.

The design data 11a is data that represents an article and the later-described auxiliary geometric shape. The design data 11a may include attribute information such as material information, type of geometric shape, color in addition to coordinate information representing the contours of an article and an auxiliary geometric shape, the names of an article (or components included in the article) and an auxiliary geometric shape. Other attribute information includes an article name, a model number, a blueprint, type of surface treatment, mass, an order classification, a designer name, remarks.

An auxiliary geometric shape is arranged in association with a setting portion for which a condition (hereinafter referred to as an analysis condition) for performing simulation for structural analysis of an article is set. For instance, an auxiliary geometric shape is arranged so as to come into contact with or include a setting portion (a point, a line segment, a face, or a solid) for which an analysis condition is set. Identification information including the analysis condition is assigned to the auxiliary geometric shape.

The analysis condition includes a boundary condition, a physical property value of a material (material conditions), a thickness of a plate element and cross-sectional characteristics (condition related to geometric shape) of a beam element, a condition related to element division such as an element type, and a mesh size, and a condition related to analysis type and output items. The boundary condition includes a restriction condition for a direction in which a certain area in an article is fixed and a direction in which movement is allowed, and a loading condition for a direction in which how much force is applied to a certain area in an article.

FIG. 1 illustrates an example of auxiliary geometric shapes 16a, 16b, 16c, and 16d arranged for an article 15 (including of components 15a, 15b).

The auxiliary geometric shape 16a is arranged so as to come into contact with an end face for which an analysis condition is set in the component 15b. The auxiliary geometric shape 16b is arranged so as to come into contact with a face (part of the cylindrical surface of the component 15a) for which an analysis condition is set in the component 15a. The auxiliary geometric shapes 16c, 16d are arranged so as to come into contact with a line segment (ridgeline of each opening portion of the component 15b) for which an analysis condition is set in the component 15b.

FIG. 1 illustrates an example of identification information assigned to each of the auxiliary geometric shapes 16a to 16d. In the example of FIG. 1, the identification information is the name of each of the auxiliary geometric shapes 16a to 16d, and the name also includes information on analysis condition and the setting portion for the analysis condition.

For instance, the name of the auxiliary geometric shape 16a is represented as "auxiliary geometric shape 1, face, complete restriction". The identification information allows a user to identify that the auxiliary geometric shape 16a sets a complete restriction, which is one of restriction conditions, to a face as the analysis condition. The name of the auxiliary geometric shape 16b is represented as "auxiliary geometric shape 2, face, distributed load, ×1000". The identification information allows a user to identify that the auxiliary geometric shape 16b sets a distributed load (1000N in the x direction), which is one of loading conditions, to a face as the analysis condition. The name of the auxiliary geometric shape 16c is represented as "auxiliary geometric shape 3, line segment, multipoint restriction, xyz". The name of the auxiliary geometric shape 16d is represented as "auxiliary geometric shape 4, line segment, multipoint restriction, xyz". The identification information allows a user to identify that the auxiliary geometric shapes 16c, 16d set an analysis condition that multipoint restriction (displacements match) is imposed between ridgelines.

The analysis conditions as described above may be included in the attribute information such as material information, type of geometric shape, and color, rather than in the name of an article.

The design data 11a representing an auxiliary geometric shape may be generated such that the information processing device 10 executes software for generating design data, receives input from a user, and generates the design data 11a based on the input. The design data 11a may be obtained from an external device of the information processing device 10 via a network, for instance.

The processing unit 12 is a processor such as a central processing unit (CPU) and a digital signal processor (DSP). However, the processing unit 12 may also include an electronic circuit for a specific application, such as an application specific integrated circuit (ASIC) and a field programmable gate array (FPGA). The processor executes a program stored in a memory such as a RAM. For instance, a structural analysis simulation program is executed. A set of multiple processors may be referred to as a "multiprocessor" or simply a "processor".

The processing unit 12 reads design data 11a as described above from the storage unit 11, and identifies the auxiliary geometric shape and the analysis information (also a setting portion when information on the setting portion is provided) from the design data 11a based on the identification information described above. For instance, when the name provides identification information as mentioned above, the processing unit 12 identifies that a component with a name such as "auxiliary geometric shape 1, face, complete restriction" is an auxiliary geometric shape (the auxiliary geometric shape 16a in the example of FIG. 1). The processing unit 12 may display the identified auxiliary geometric shape on the screen of a display device which is not illustrated. In that case, the processing unit 12 may display the auxiliary geometric shape distinctively (for instance, with a color) from other components. The processing unit 12 may display the analysis condition included in the identification information assigned to the auxiliary geometric shape.

Subsequently, the processing unit 12 sets the analysis condition to a setting portion based on the identification information. For instance, when the auxiliary geometric shape 16a is identified, to which the identification information of "auxiliary geometric shape 1, face, complete restriction" is assigned, a restriction condition called complete restriction is set for a face of the component 15b as the analysis condition, the face being in contact with the auxiliary geometric shape 16a. After converting the design data 11a representing an article to a finite element model, the processing unit 12 may set the analysis condition for the setting portion in the finite element model.

An example of a method of determining a setting portion when multiple faces are in contact with an auxiliary geometric shape or information on a setting portion is not included in the identification information will be described later.

When a setting portion for an analysis condition is determined, depending on the manner of the definition of the geometric shape of an article in the design data 11a, the definition is changed to divide the geometric shape, and an example of the definition change will be described later.

After setting an analysis condition, the processing unit 12 executes structural analysis simulation based on the analysis condition set. The processing unit 12 may display a result of the structural analysis simulation on the screen of a display device which is not illustrated.

As described above, the information processing device 10 of the first embodiment uses the design data 11a representing an article, and an auxiliary geometric shape which is arranged in association with a setting portion of an article for setting an analysis condition, and to which identification information including the analysis condition is assigned. For example, independently from an article to be structurally analyzed, the design data 11a is used in which an auxiliary geometric shape is arranged in advance in association with a setting part for an analysis condition. The information processing device 10 then identifies the analysis condition based on the identification information of the auxiliary geometric shape, and sets the analysis condition for the setting portion associated with. Consequently, the operation efficiency in setting an analysis condition at the time of structural analysis simulation increases, and thus it is possible to reduce the time taken for structural analysis.

Since it is sufficient that an auxiliary geometric shape be arranged so as to come into contact with or include a setting portion (a point, a line segment, a face, or a solid or any combination thereof) for which an analysis condition is set, arrangement of an auxiliary geometric shape is made relatively easily.

Since an auxiliary geometric shape is assigned information that determines one of a point, a line segment, a face, and a solid, which is in contact with the auxiliary geometric shape and for which an analysis condition is set, or a point, a line segment, a face, or a solid, or any combination thereof which is included in the auxiliary geometric shape and for which an analysis condition is set, thus the setting portion is easily identified.

Second Embodiment

Next, a second embodiment will be described.

Figure 2:
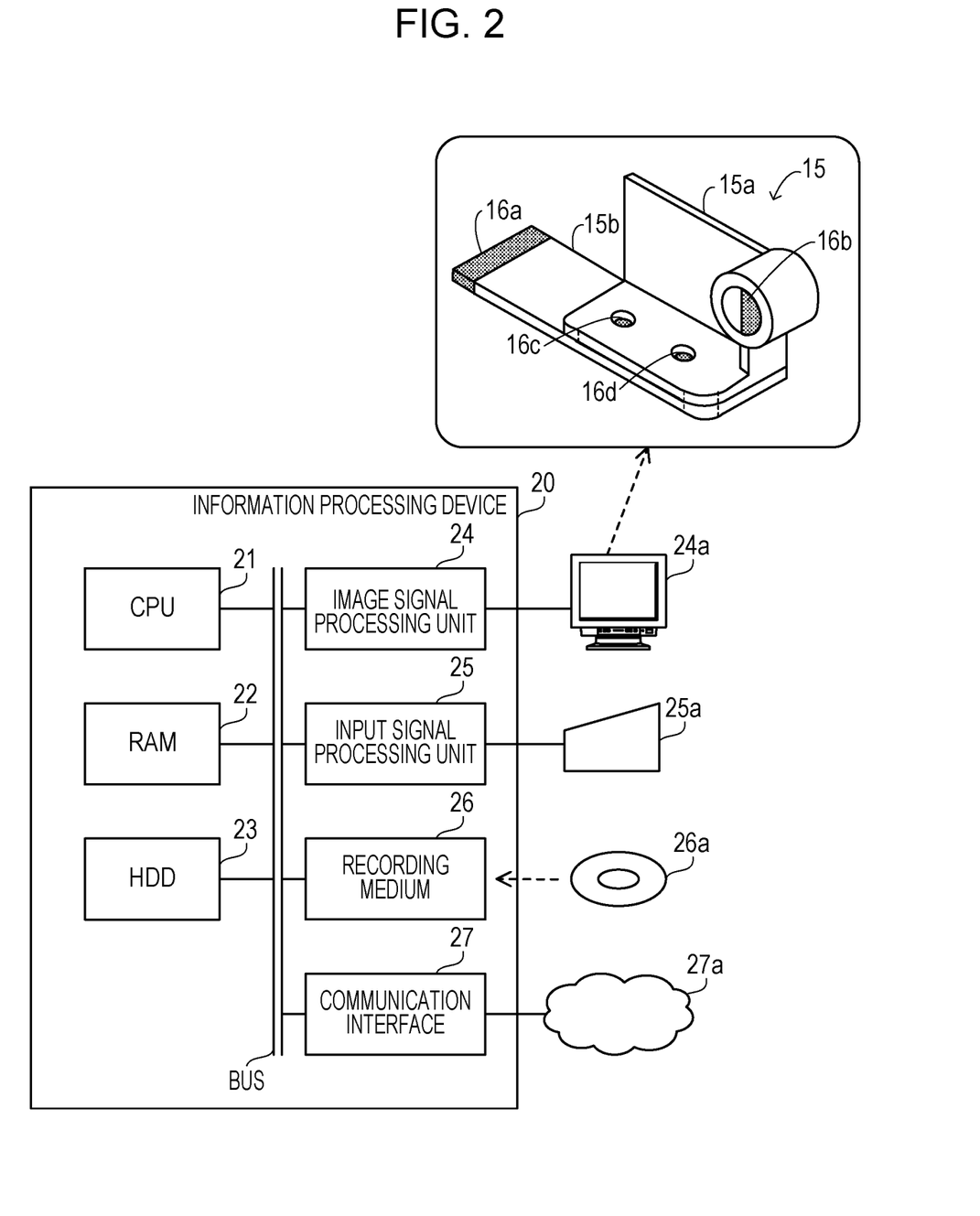
FIG. 2 is a block diagram illustrating a hardware example of the information processing device.

FIG. 2 is a block diagram illustrating a hardware example of the information processing device.

The information processing device 20 has a CPU 21, a RAM 22, a HDD 23, an image signal processing unit 24, an input signal processing unit 25, a medium reader 26, and a communication interface 27. The above-mentioned units are connected to a bus.

The CPU 21 is a processor including a calculation circuit that executes commands of a program. The CPU 21 loads at least part of programs and data stored in the HDD 23 to the RAM 22, and executes a program. The CPU 21 may include multiple processor cores, the information processing device 20 may include multiple processors, and the processing described below may be executed in parallel using multiple processors or processor cores. A set (multiprocessor) of multiple processors may be referred to as a "processor".

The RAM 22 is a volatile semiconductor memory that temporarily stores a program executed by the CPU 21 and/or data used by the CPU 21 for calculation. The information processing device 20 may include a type of memory other than the RAM, and may include multiple memories.

The HDD 23 is a non-volatile storage device that stores programs such as, an operating system (OS), middleware, and application software, and data. The programs include a program that causes the information processing device 20 to perform generation of design data and structural analysis simulation, for instance. The information processing device 20 may include other types of storage device, such as a flash memory and a solid state drive (SSD), and may include multiple non-volatile storage devices.

The image signal processing unit 24 outputs an image on a display 24a coupled to the information processing device 20 according to a command from the CPU 21. The image signal processing unit 24 displays, for instance, three-dimensional data of the article 15 and the auxiliary geometric shape 16a to 16d as illustrated in FIG. 1 on the display 24a. As the display 24a, it is possible to use a cathode ray tube (CRT) display, a liquid crystal display (LCD), a plasma display panel (PDP), or an organic electro luminescent (OEL) display.

The input signal processing unit 25 obtains an input signal from an input device 25a connected to the information processing device 20, and outputs the signal to the CPU 21. As the input device 25a, it is possible to use a pointing device, such as a mouse, a touch panel, a touchpad, and a trackball, a keyboard, a remote controller, and a button switch. Multiple types of input devices may be connected to the information processing device 20.

The medium reader 26 is a reading device that reads a program and data recorded on a recording medium 26a. As the recording medium 26a, for instance, a magnetic disk, an optical disc, a magneto-optical disk (MO disk), or a semiconductor memory may be used. The magnetic disk includes a flexible disk (FD) and a HDD. The optical disc includes a compact disc (CD) and a digital versatile disc (DVD).

The medium reader 26 copies, for instance, a program and/or data read from the recording medium 26a to another recording medium such as the RAM 22 and the HDD 23. The read program is executed by the CPU 21, for instance. The recording medium 26a may be a portable recording medium, and may be used for distribution of a program and/or data. The recording medium 26a and the HDD 23 may be referred to as a computer-readable recording medium.

The communication interface 27 is an interface that is connected to the network 27a and performs communication with other information processing devices via the network 27a. The communication interface 27 may be a wired communication interface connected a communication device such as a switch via a cable, or a wireless communication interface connected to a base station via a wireless link.

The information processing device 20 like this may be a client computer or a server computer.

Next, the function and the processing steps of the information processing device 20 will be described.

Figure 3:
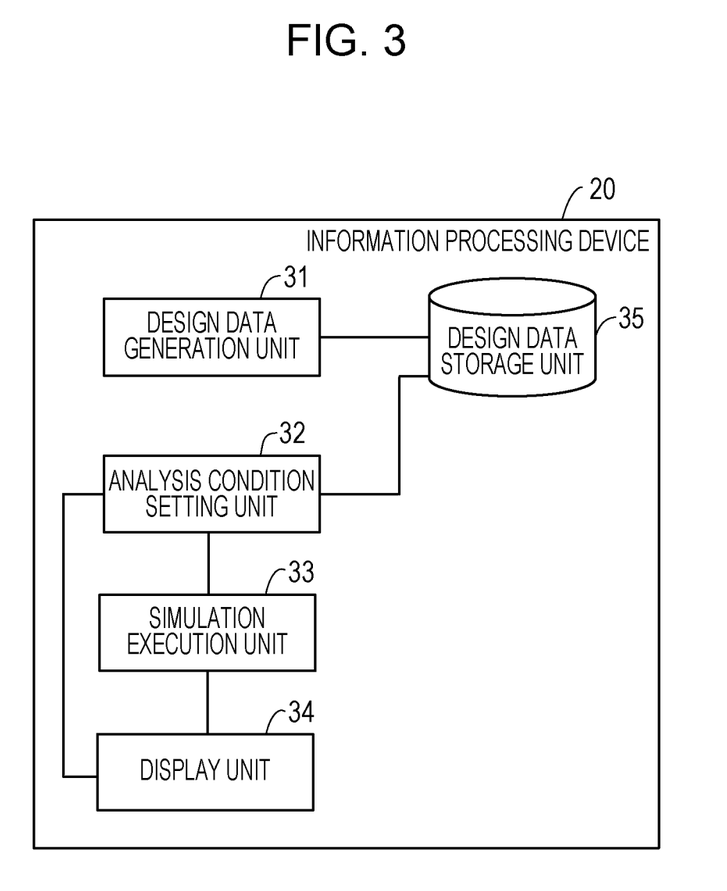
FIG. 3 is a block diagram illustrating a functional example of the information processing device.

FIG. 3 is a block diagram illustrating a functional example of the information processing device.

The information processing device 20 includes a design data generation unit 31, an analysis condition setting unit 32, a simulation execution unit 33, a display unit 34, and a design data storage unit 35. The design data generation unit 31, the analysis condition setting unit 32, the simulation execution unit 33, and the display unit 34 may be implemented using a program module executed by the CPU 21, for instance. In the following description, the design data generation unit 31 and other functional blocks are implemented using different program modules. However, the design data generation unit 31 and other functional blocks may be implemented using one program module. The design data storage unit 35 may be implemented using, for instance, a memory area secured in the RAM 22 or the HDD 23.

The design data generation unit 31 generates the above-described design data representing an auxiliary geometric shape in addition to an article to be analyzed, and stores the design data in the design data storage unit 35. The design data generation processing by the design data generation unit 31 may be performed by another device different from the information processing device 20.

The analysis condition setting unit 32 reads design data from the design data storage unit 35, and identifies an auxiliary geometric shape and an analysis condition based on identification information, the auxiliary geometric shape being arranged in association with a setting portion for which the analysis condition is set, then sets the analysis condition for the setting portion.

The simulation execution unit 33 executes structural analysis simulation based on the set analysis condition.

The display unit 34 controls the image signal processing unit 24 to display three-dimensional data of the article and the auxiliary geometric shape and a result of the structural analysis simulation on the screen of the display 24a.

The design data storage unit 35 stores the above-described design data representing an auxiliary geometric shape in addition to the article to be analyzed.

Figure 4:
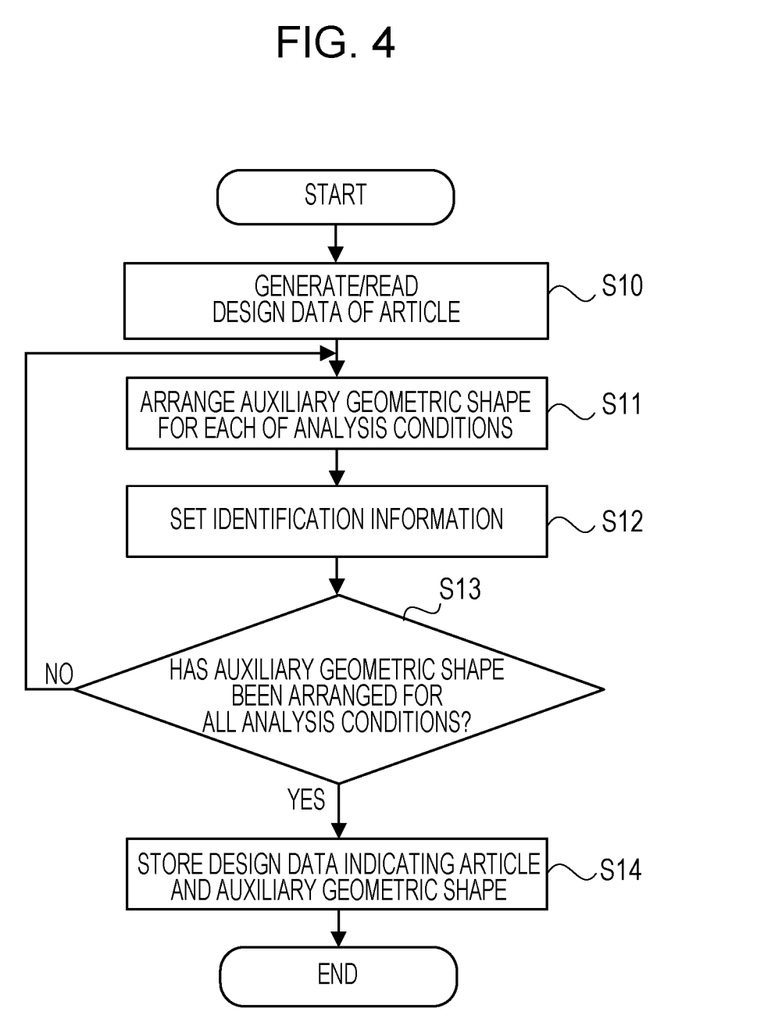
FIG. 4 is a flowchart illustrating an example flow of design data generation processing performed by the information processing device.

FIG. 4 is a flowchart illustrating an example flow of design data generation processing performed by the information processing device.

(S10) The design data generation unit 31 first generates design data of an article to be analyzed. When the design data is stored in the design data storage unit 35, the design data generation unit 31 reads the design data from the design data storage unit 35. The design data generation unit 31, may cooperate with, for instance, the display unit 34 to display three-dimensional data of an article being designed on the screen of the display 24a according to a signal inputted from the input device 25a by an operation of a user.

The design data may include attribute information such as the name of an article (or components included in the article), material information, type of geometric shape, and color in addition to the coordinate information representing the geometric shape of the article. Other attribute information includes an article name, a model number, a blueprint, type of surface treatment, mass, an order classification, a designer name, remarks.

(S11) Subsequently, the design data generation unit 31 arranges an auxiliary geometric shape for each of the analysis conditions to be set in the structural analysis simulation.

When the setting portion for the analysis condition is a face (or part of a face) of an article, the design data generation unit 31 arranges an auxiliary geometric shape (a face or a solid) having a face with the same position and geometric shape as those of the face or part of the face of the article, or arranges an auxiliary geometric shape (a face or a solid) that includes only the face or part of the face. For instance, the auxiliary geometric shape 16a illustrated in FIG. 1 is an auxiliary geometric shape having a face with the same position and geometric shape as those of an end face, for which an analysis condition (restriction condition) is to be set, of the component 15b.

Figure 5:
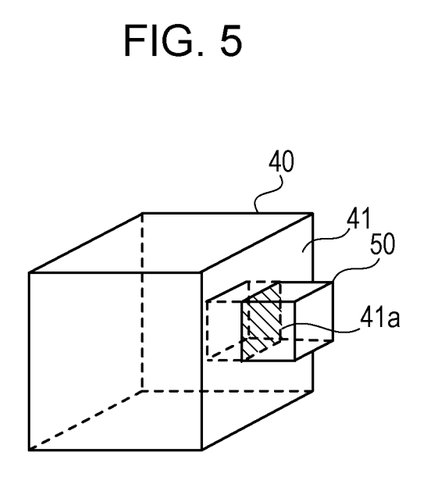
FIG. 5 is a view illustrating an example of an auxiliary geometric shape when a setting portion is a partial area of a face, the auxiliary geometric shape including only the area.

FIG. 5 is a view illustrating an example of an auxiliary geometric shape when a setting portion is a partial area of a face, the auxiliary geometric shape including only the area.

FIG. 5 illustrates an article 40 having six faces. When the setting portion, for which an analysis condition is to be set, in the article 40 is an area 41a in a face 41, for instance, as illustrated in FIG. 5, the design data generation unit 31 arranges a solid 50 including only the area 41a (not including other geometric shapes which define the article 40) as an auxiliary geometric shape.

When the setting portion is a line segment (a ridgeline or part of a ridgeline) of an article, the design data generation unit 31 arranges an auxiliary geometric shape (a line segment, a face, or a solid) having a line segment with the same position and length as those of the line segment of the article. The design data generation unit 31 arranges an auxiliary geometric shape (a line segment, a face, or a solid) that includes only the line segment (does not include other line segments which define the article). For instance, the auxiliary geometric shapes 16c, 16d illustrated in FIG. 1 are each an auxiliary geometric shape having a line segment with the same position and length as those of the ridgeline, for which an analysis condition (restriction condition) is to be set, of each opening portion of the component 15b.

Figure 6:
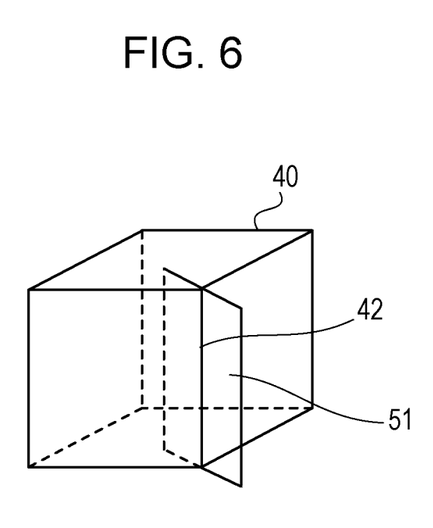
FIG. 6 is a view illustrating an example of an auxiliary geometric shape when a setting portion is a line segment, the auxiliary geometric shape including only the line segment.

FIG. 6 is a view illustrating an example of an auxiliary geometric shape when a setting portion is a line segment, the auxiliary geometric shape including only the line segment. When the setting portion, for which an analysis condition is to be set, in the article 40 is a ridgeline 42, for instance, as illustrated in FIG. 6, the design data generation unit 31 arranges a face 51 including only the ridgeline 42 (not including other ridgelines which define the article 40) as an auxiliary geometric shape.

When the setting portion is a point of the article, the design data generation unit 31 arranges an auxiliary geometric shape (a point, a line segment, a face, or a solid) having a point with the same position as that of the point of the article. The design data generation unit 31 arranges an auxiliary geometric shape (a point, a line segment, a face, or a solid) including only the point (not including other points which define the article).

Figure 7:
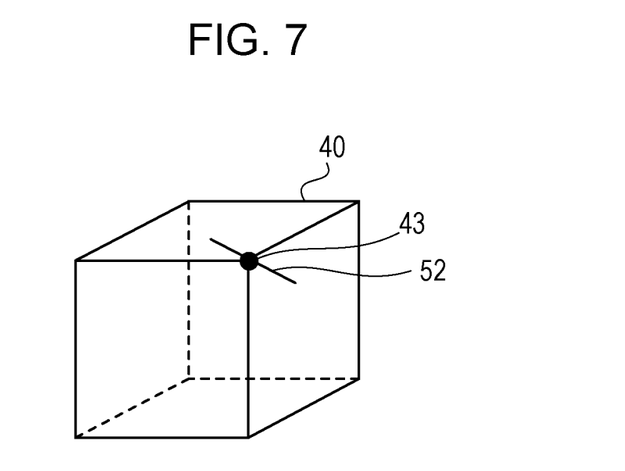
FIG. 7 is a view illustrating an example of an auxiliary geometric shape when a setting portion is a point, the auxiliary geometric shape including only the point.

FIG. 7 is a view illustrating an example of an auxiliary geometric shape when a setting portion is a point, the auxiliary geometric shape including only the point. When the setting portion, for which an analysis condition is to be set, in the article 40 is a point 43, for instance, as illustrated in FIG. 7, the design data generation unit 31 arranges a line segment 52 (not including other points which define the article 40) as an auxiliary geometric shape.

When the setting portion is a solid included in the article, the design data generation unit 31 arranges an auxiliary geometric shape (solid) that matches the solid or an auxiliary geometric shape (solid) that includes only the solid.

Figure 8:
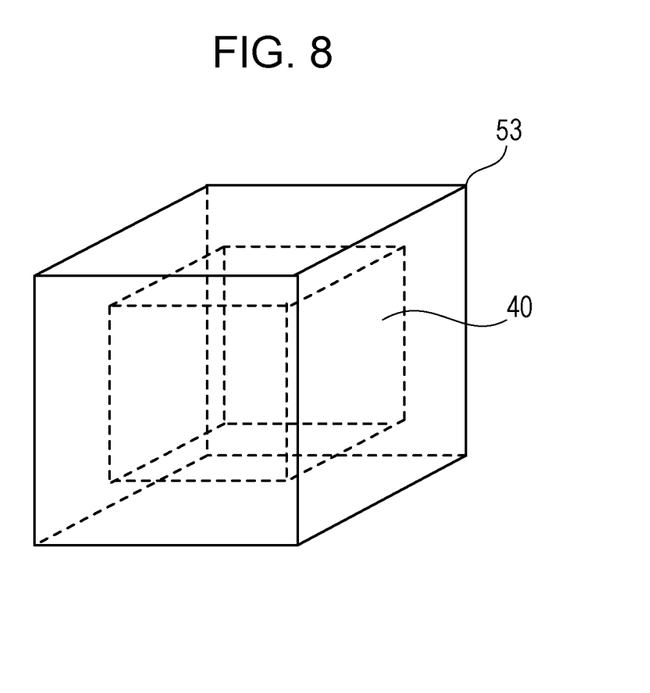
FIG. 8 is a view illustrating an example of an auxiliary geometric shape when a setting portion is a solid, the auxiliary geometric shape including only the solid.

FIG. 8 is a view illustrating an example of an auxiliary geometric shape when a setting portion is a solid, the auxiliary geometric shape including only the solid.

When the whole article 40 which is a sold is the setting portion for which an analysis condition is to be set, for instance, as illustrated in FIG. 8, the design data generation unit 31 arranges a solid 53 including only the article 40 as an auxiliary geometric shape.

When auxiliary geometric shapes to set related analysis conditions for multiple geometric shapes at different positions in an article are arranged, the design data generation unit 31 may arrange an auxiliary geometric shape for one shape, or may arrange an auxiliary geometric shape for each shape. Master nodes and slave nodes may be set in multipoint restriction as an example of setting related analysis conditions for multiple geometric shapes at different positions in an article.

When related analysis conditions are set for multiple areas at the same position (for instance, a connection surface between multiple components) in an article, the design data generation unit 31 may arrange an auxiliary geometric shape for one area, or may arrange an auxiliary geometric shape for each area.

The processing of arranging an auxiliary geometric shape as described above is performed by the design data generation unit 31 according to a signal inputted from the input device 25a by an operation of a user, for instance. For instance, in the three-dimensional data of an article displayed on the screen of display 24a, the design data generation unit 31 may select and arrange the above-described auxiliary geometric shape for a setting portion designated by a user in accordance with an arrangement rule determined in advance. A user may specify the size and the shape of an auxiliary geometric shape using the input device 25a while checking the screen, and the design data generation unit 31 may arrange the auxiliary geometric shape according to the contents specified. The information indicating an arrangement rule according to which an auxiliary geometric shape is arranged is stored in a storage unit, such as the HDD 23 or the RAM 22, as design data or data different from the design data, for instance.

(S12) Subsequently, the design data generation unit 31 sets identification information for the auxiliary geometric shape. As the identification information an auxiliary geometric shape, the design data generation unit 31 sets attribute information such as the names of an article and a component, material information, type of geometric shape, and color.

When a name is used as the identification information of an auxiliary geometric shape, the design data generation unit 31 sets the name to "auxiliary geometric shape 1, pressure (unit), 0.1", "auxiliary geometric shape 2, restriction, 123456" or the like. The "pressure (unit), 0.1" represents an analysis condition (loading condition) that a pressure loading per unit area is 0.1, and the "restriction, 123456" represents an analysis condition (restriction condition) that restriction is imposed in all degrees of freedom (six directions).

When material information is used as the identification information of an auxiliary geometric shape, the design data generation unit 31 sets material information to "material A: auxiliary geometric shape, complete restriction", for instance.

When the type of geometric shape is used as the identification information of an auxiliary geometric shape, the design data generation unit 31 sets the type of geometric shape to "cylinder/prism: restriction", "circular cone/pyramid: load", for instance. The type of geometric shape does not have to match the shape of an auxiliary geometric shape generated, and may be set as the identification information assigned to the auxiliary geometric shape.

When color is used as the identification information of an auxiliary geometric shape, the design data generation unit 31 sets the color to "blue: complete restriction", "red: pressure loading", for instance. The color does not have to match the color of an auxiliary geometric shape generated, and may be set as the identification information assigned to the auxiliary geometric shape. However, a color is set which is different from the color of the article to be analyzed, and as long as a correspondence relationship between analysis condition and color is determined in advance, when design data including the auxiliary geometric shape is displayed on the screen at the time of structural analysis, the color makes it easy to visually identify what kind of analysis condition is set.

The identification information may be set in a combination of multiple attributes of the pieces of attribute information such as the name, material information, type of geometric shape, and color.

The identification information may include information on the setting portion for analysis condition. For instance, in the example illustrated in FIG. 1, the name, such as "auxiliary geometric shape 1, face, complete restriction", includes information on the setting portion (in this case, it is indicated that the setting portion is a face). Similarly, the attribute information such as material information, type of geometric shape, and color may include information on the setting portion for analysis condition.

In the processing in step S11, when one auxiliary geometric shape is arranged for multiple areas for which related analysis conditions are set, the design data generation unit 31 may have the identification information assigned to the auxiliary geometric shape include information for identifying the multiple areas. On the other hand, when an auxiliary geometric shape is arranged for each of multiple areas for which related analysis conditions are set, the design data generation unit 31 may have the identification information assigned to each auxiliary geometric shape include information that identifies that the auxiliary geometric shape is arranged for a corresponding one of the multiple areas for which related analysis conditions are set.

For instance, it is assumed that "multipoint restriction 1A" is a keyword that represents a master node in multipoint restriction, and "multipoint restriction 113" is a keyword that represents a slave node in multipoint restriction. When an analysis condition that the displacement of the slave node in the z direction (direction number=3) matches the displacement of the master node in the z direction is set, the design data generation unit 31 determines the identification information of an auxiliary geometric shape arranged for the face of an article for which the master node is set to be "auxiliary geometric shape 3, face, multipoint restriction 1A, 3", for instance. The design data generation unit 31 determines the identification information of an auxiliary geometric shape arranged for the face of an article for which the slave node is set to be "auxiliary geometric shape 4, face, multipoint restriction 1B, 3", for instance.

(S13) Subsequently, the design data generation unit 31 determines whether or not arrangement of an auxiliary geometric shape for all analysis conditions has been completed. When arrangement of an auxiliary geometric shape for all analysis conditions has not been completed, the design data generation unit 31 repeats the processing from step S11.

(S14) When arrangement of an auxiliary geometric shape for all analysis conditions has been completed, the design data generation unit 31 stores the design data representing the article and the auxiliary geometric shape in the design data storage unit 35, and completes the design data generation processing.

Figure 9:
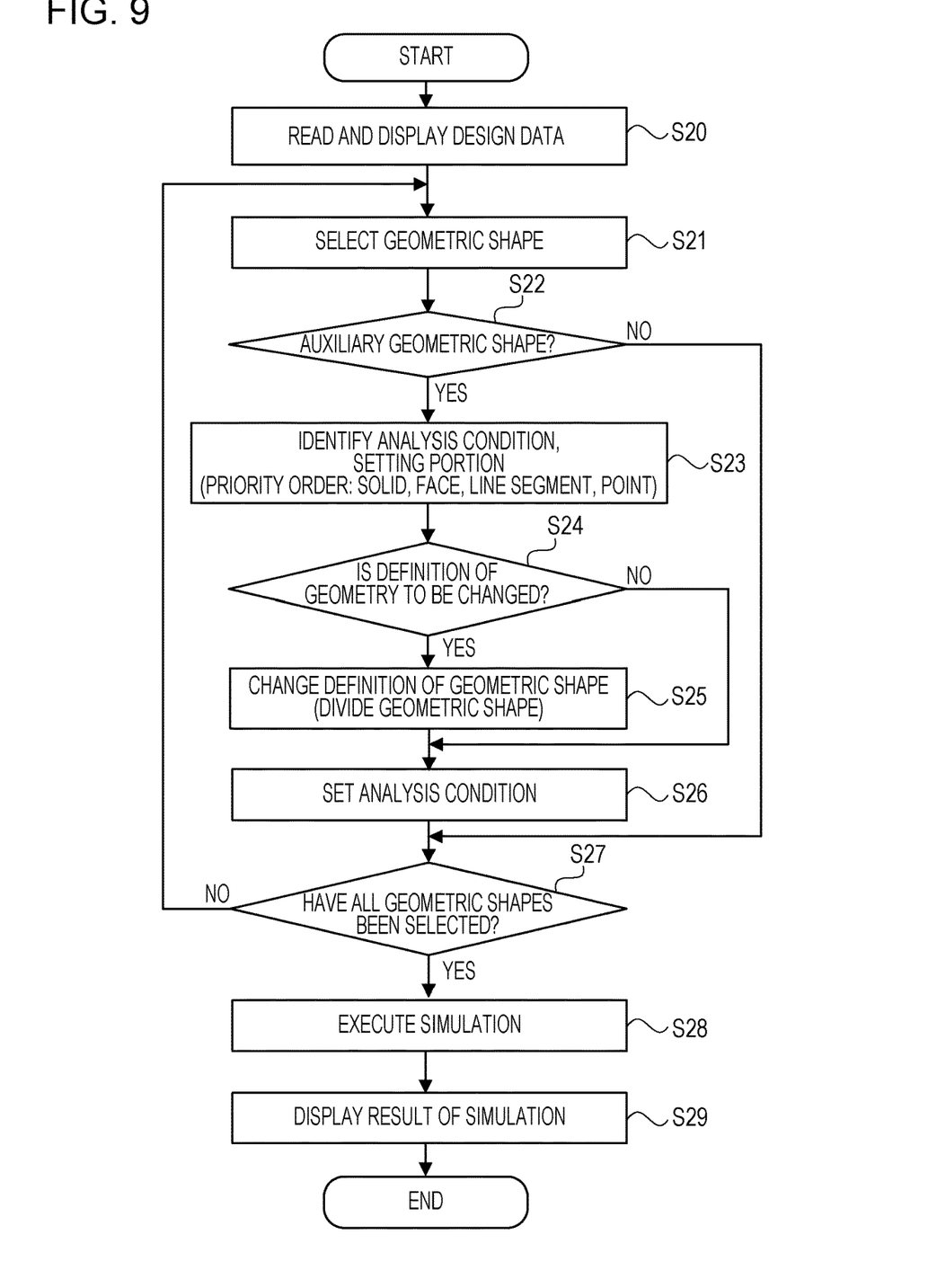
FIG. 9 is a flowchart illustrating an example flow of structural analysis simulation performed by the information processing device.

FIG. 9 is a flowchart illustrating an example flow of structural analysis simulation performed by the information processing device.

(S20) The analysis condition setting unit 32 reads the design data (including the auxiliary geometric shape) stored in the design data storage unit 35, and displays the article and the auxiliary geometric shape on the display unit 34. In this stage, the article and the auxiliary geometric shape are not distinguished on the screen. When confirmation of the auxiliary geometric shape by a user is not desirable, the processing of step S20 does not have to be performed.

(S21) The analysis condition setting unit 32 selects a geometric shape (a point, a ridgeline, a face, or a solid, or an auxiliary geometric shape which defines an article) from the design data.

(S22) The analysis condition setting unit 32 determines whether or not the selected geometric shape is an auxiliary geometric shape. Whether or not the selected geometric shape is an auxiliary geometric shape is identifiable by the identification information described above. When the selected geometric shape is an auxiliary geometric shape, the processing in step S23 is performed, and when the selected geometric shape is not an auxiliary geometric shape, the processing in step S27 is performed.

(S23) The analysis condition setting unit 32 identifies the analysis condition and the setting portion.

Method of Identifying Analysis Condition

The analysis condition setting unit 32 identifies one of the pieces of attribute information, such as the name, material information, type of geometric shape, and color, of the auxiliary geometric shape, or the analysis condition included in the pieces of identification information set. When it is determined in advance that the analysis condition is set to which one of the pieces of attribute information, such as the name, material information, type of geometric shape, and color, the analysis condition setting unit 32 only have to detect the piece of attribute information. When it is indefinite whether the analysis condition is set to which one of the pieces of attribute information, such as the name, material information, type of geometric shape, and color, the analysis condition setting unit 32 searches for each of the pieces of attribute information to identify the analysis condition.

When the geometric shape selected in the processing of step S22 is determined to be an auxiliary geometric shape, the analysis condition setting unit 32 may display the auxiliary geometric shape on the display unit 34 distinctively from the geometric shape of the article by giving a different color to the auxiliary geometric shape from the color of the geometric shape of the article, for instance. The analysis condition setting unit 32 may further display the identified analysis condition on the display unit 34.

Method of Determining That Setting Portion Is Which One of Solid, Face, Line Segment, and Point When information (information indicating which one of solid, face, line segment, and point) on the setting portion for analysis condition is included in the identification information, the analysis condition setting unit 32 detects information on the setting portion included in one of the pieces of attribute information, such as the name, material information, type of geometric shape, and color, of the auxiliary geometric shape. When it is determined in advance that information on the setting portion is set to which one of the pieces of attribute information, such as the name, material information, type of geometric shape, and color, the analysis condition setting unit 32 only have to detect the piece of attribute information. When it is indefinite whether information on the setting portion is set to which one of the pieces of attribute information, such as the name, material information, type of geometric shape, and color, the analysis condition setting unit 32 searches for each of the pieces of attribute information to detect the information on the setting portion.

When the information on the setting portion for analysis condition is not included in the identification information, the analysis condition setting unit 32 determines that the setting portion is which one of solid, face, line segment, and point in accordance with an arrangement rule determined in advance based on the auxiliary geometric shape.

For instance, when multiple geometric shapes overall matching the auxiliary geometric shape or overall including the auxiliary geometric shape are present in an article, the analysis condition setting unit 32 determines that the setting portion is which one of solid, face, line segment, and point in the priority order of solid, face, line segment, and point. When there is no geometric shape overall matching the auxiliary geometric shape or overall including the auxiliary geometric shape, out of geometric shapes each partially matching the auxiliary geometric shape, the analysis condition setting unit 32 determines that the setting portion is which one of face, line segment, and point in the priority order of face, line segment, and point. When there is no geometric shape even partially matching the auxiliary geometric shape, the analysis condition setting unit 32 determines the setting portion to be a solid included in the auxiliary geometric shape.

Example of Method of Determining Setting Portion

When the setting portion is determined to be a face, if one face of the auxiliary geometric shape which is a solid matches one face (or part of a face) of an article, it is possible to identify that the face (or part of the face) is the setting portion for analysis condition. However, it may be difficult to generate an auxiliary shape in this manner depending on the geometric shape of an article, and an auxiliary geometric shape having multiple faces matching facing of the article may be generated.

Figure 10:
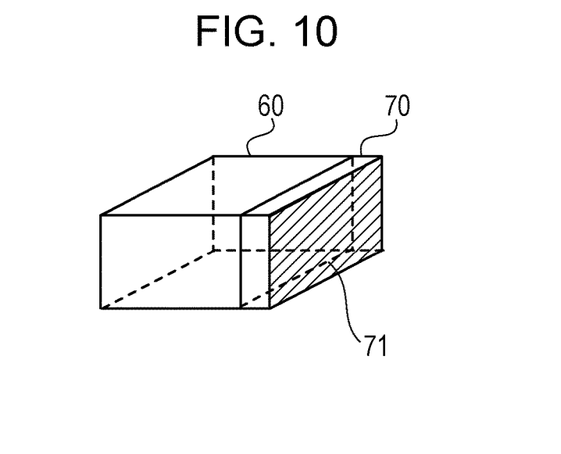
FIG. 10 is a view illustrating an example of an auxiliary geometric shape having multiple faces matching faces of an article.

FIG. 10 is a view illustrating an example of an auxiliary geometric shape having multiple faces matching faces of an article.

FIG. 10 illustrates an example in which an auxiliary geometric shape 70 is generated inside an article 60. In this case, five faces of the auxiliary geometric shape 70 match corresponding faces or part of the faces of the article 60.

In this case, the analysis condition setting unit 32 determines the face of the article 60 matching, for instance, a face 71 having the largest area of the above-mentioned five faces to be the setting portion for analysis condition.

The analysis condition setting unit 32 may determine a face (or part of the face) of the article matching the face with the smallest number to define each face among the five faces to be the setting portion for analysis condition.

There is a case where one face of the auxiliary geometric shape which is a solid matches one face (or part of the face) of an article, and further matches one face (or part of the face) of another article (for instance, when two articles are connected at a face). In this case, the analysis condition setting unit 32 determines, for instance, a face (or part of a face) of an article including the auxiliary geometric shape to be the setting portion for the analysis condition. The design data generation unit 31 may include information on which article an analysis condition is set in the identification information of the auxiliary geometric shape in advance, and the analysis condition setting unit 32 may determine the setting portion for the analysis condition based on the information.

When the setting portion is determined to be a line segment, and one line segment of an auxiliary geometric shape which is a face or a solid matches one line segment (a ridgeline or part of a ridgeline) of an article, it is possible to identify that the line segment is the setting portion for the analysis condition. However, it may be difficult to generate an auxiliary shape in this manner depending on the geometric shape of an article, and an auxiliary geometric shape having multiple line segments matching line segments of the article may be generated.

In this case, the analysis condition setting unit 32 determines, for instance, a line segment of an article matching the longest line segment of the multiple line segments to be the setting portion for the analysis condition.

The analysis condition setting unit 32 may determine a line segment of the article matching the line segment with the smallest number to define a line segment among the multiple line segments to be the setting portion for the analysis condition.

There is a case where one line segment of the auxiliary geometric shape which is a face or a sold matches one line segment of an article, and further matches one line segment of another article (for instance, when two articles are connected at a face or a line segment). In this case, the analysis condition setting unit 32 determines, for instance, a line segment of an article including the auxiliary geometric shape to be the setting portion for the analysis condition. The design data generation unit 31 may include information on which article an analysis condition is set in the identification information of the auxiliary geometric shape in advance, and the analysis condition setting unit 32 may determine the setting portion for the analysis condition based on the information.

When the setting portion is determined to be a point, and one point of an auxiliary geometric shape which is a line segment, a face or a solid matches one point of an article, it is possible to identify that the point is the setting portion for the analysis condition. However, it may be difficult to generate an auxiliary shape in this manner depending on the geometric shape of an article, and an auxiliary geometric shape having multiple points matching points of the article may be generated.

In this case, the analysis condition setting unit 32 determines, for instance, the point at the center of the auxiliary geometric shape (the center of gravity or the center of the figure) of the multiple points to be the setting portion for the analysis condition.

The analysis condition setting unit 32 may determine a point of the article matching the point with the smallest number to define each point to be the setting portion for the analysis condition.

The technique used for identifying the setting portion for the analysis condition is determined by the manner in which an auxiliary geometric is arranged in the processing (step S11) of arranging an auxiliary geometric shape as described above. Therefore, the analysis condition setting unit 32 determines the setting portion by one of the methods described above based on the information on the manner of arrangement (arrangement rule).

When the design data generation unit 31 is able to arrange an auxiliary geometric shape which includes only the setting portion for the analysis condition, the analysis condition setting unit 32 determines a geometric shape (a point, a line segment, a face, or a solid) in the article included in the auxiliary geometric shape to be the setting portion for the analysis condition.

The analysis condition setting unit 32 may display the identified setting portion for the analysis condition on the display unit 34.

(S24) After the processing of step S23, the analysis condition setting unit 32 determines whether or not the definition of the geometric shape of the article is changed. When the geometric shape of the article in contact with the auxiliary geometric shape or included in the auxiliary geometric shape is part of geometric shapes defined in the design data, the analysis condition setting unit 32 determines the definition of the geometric shape is changed.

When it is determined that the definition of the geometric shape of the article is changed, the analysis condition setting unit 32 performs the processing of step S25, and when it is determined that the definition of the geometric shape of the article does not have to be changed, the analysis condition setting unit 32 performs the processing of step S26.

(S25) The analysis condition setting unit 32 changes the definition of the geometric shape of the article which is in contact with the auxiliary geometric shape or included in the auxiliary geometric shape.

Figure 11:
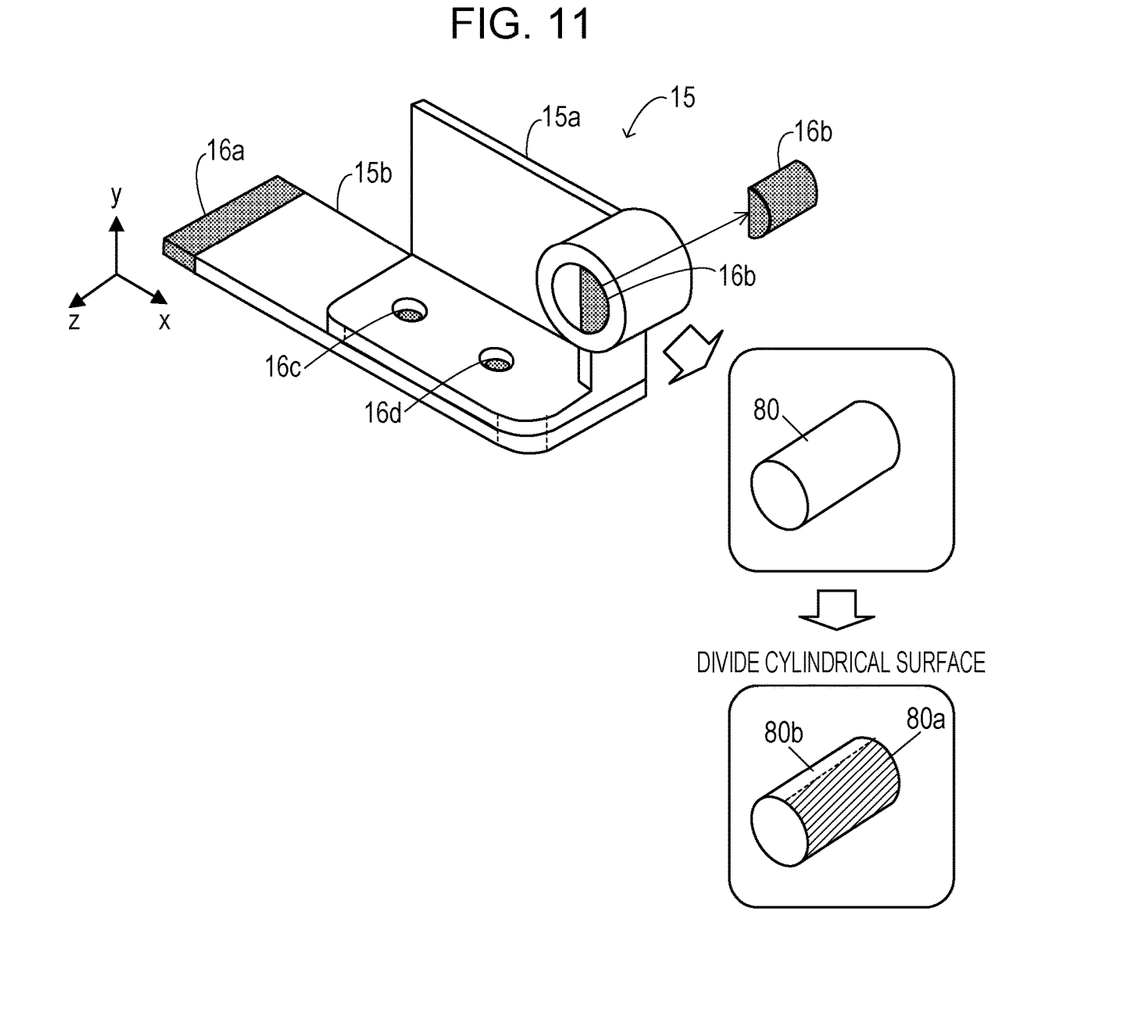
FIG. 11 is a view illustrating an example of change of the definition of a geometric shape.

FIG. 11 is a view illustrating an example of change of the definition of a geometric shape. FIG. 11 illustrates the article 15 and the auxiliary geometric shapes 16a to 16d illustrated in FIG. 1.

It is assumed that a cylindrical surface 80 is defined in the design data representing the article 15 (component 15a). When in the cylindrical surface 80, a loading condition is set for a face in contact with the curved surface of the auxiliary geometric shape 16b in the x direction, the analysis condition setting unit 32 changes the definition of the geometric shape of the cylindrical surface 80 so that the cylindrical surface 80 is divided into a face 80a in contact with the curved surface of the auxiliary geometric shape 16b, and a face 80b not in contact with the curved surface.

Figure 12:
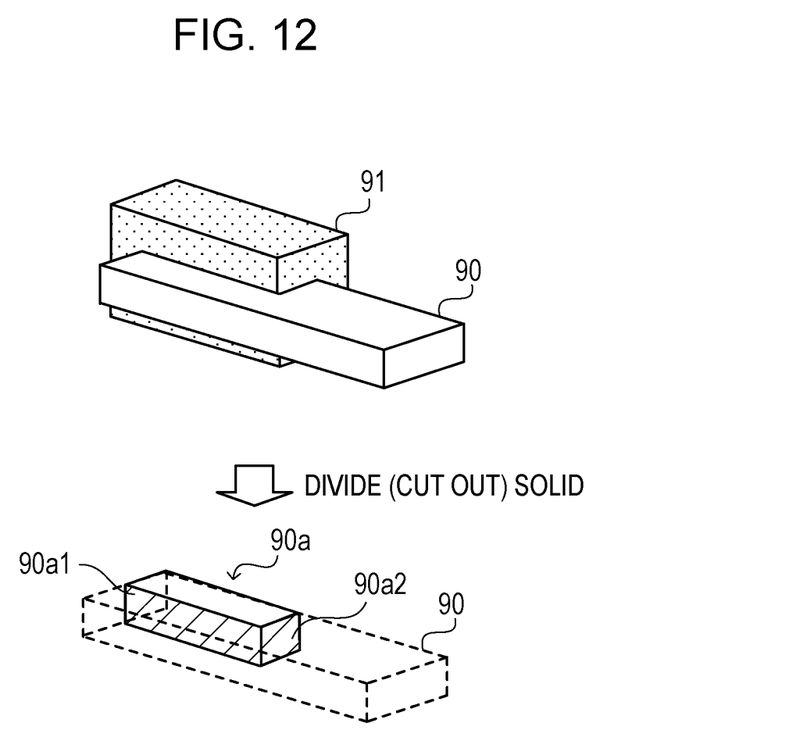
FIG. 12 is a view illustrating another example of change of the definition of a geometric shape.

FIG. 12 is a view illustrating another example of change of the definition of a geometric shape.

For instance, when self-weight bending of an article, such as a plate with both ends supported, is analyzed, in order to increase the efficiency of analysis, a symmetric condition is set for the article which is divided into four partial areas in which the characteristics of the article are symmetric, and at the time of analysis, only one of the areas is analyzed.

In order to cope with such analysis, in the above-described processing of the step S11, as illustrated in FIG. 12, an auxiliary geometric shape 91 including only ¼ of an article 90 is arranged. In the processing of step S12, identification information including the symmetric condition is assigned to the auxiliary geometric shape 91. In the processing of step S23, the analysis condition setting unit 32 identifies the setting portion (for instance, faces 90a1, 90a2) for the symmetric condition based on the identification information. In the processing of step S25, the analysis condition setting unit 32 changes the definition of the geometric shape so that the solid 90a is cut out from the article 90.

(S26) The analysis condition setting unit 32 sets an analysis condition for the identified setting portion. The analysis condition setting unit 32 may display a result of setting of the analysis condition on the display unit 34.

(S27) The analysis condition setting unit 32 determines whether or not all geometric shapes have been selected, and when some geometric shapes are not selected, repeats the processing from step S21. When all geometric shapes have been selected, the processing of step S28 is performed.

(S28) The simulation execution unit 33 executes structural analysis simulation of the article based on the set analysis condition. At the time of structural analysis simulation, the simulation execution unit 33 first converts the geometric shapes which define an article to be analyzed to a finite element model. In this process, the simulation execution unit 33 also converts the set analysis condition to a condition for nodes, elements, or element faces in the finite element model. Subsequently, the simulation execution unit 33 executes the simulation.

The simulation execution unit 33 may convert each geometric shape to the finite element model according to a signal inputted from the input device 25a by an operation of a user.

(S29) The display unit 34 controls the image signal processing unit 24 to display a result of the structural analysis simulation on the screen of the display 24a.

When the design of an article is changed, the processing from step S10 is repeated. However, the design data generation unit 31 may use the auxiliary geometric shape arranged before the design change as it is, or may change the auxiliary geometric shape as appropriate. When the design is changed, the auxiliary geometric shape arranged before the design change is displayed on the screen along with the auxiliary geometric shape after the design change so that it is easy for a user to identify which part of the auxiliary geometric shape is changed according to the design change.

In the description above, an analysis condition and a setting condition are identified, and the analysis condition is set before the geometric shapes, which define an article to be analyzed, are converted into a finite element model. However, without being limited to this, the simulation execution unit 33 may perform conversion of the geometric shapes into a finite element model before an analysis condition and a setting condition are identified, and the analysis condition is set (or before the processing of arranging an auxiliary geometric shape is performed). In this case, setting of an analysis condition in step S26 is made for the nodes, elements, or element faces in the finite element model. The simulation execution unit 33 may directly generate a finite element model for an article to be analyzed according to a signal inputted from the input device 25a by an operation of a user, for instance.

As described above, with the information processing device 20 of the second embodiment, the same effect as in the information processing device 10 of the first embodiment is achieved.

When multiple geometric shapes overall matching the auxiliary geometric shape or overall including the auxiliary geometric shape are present, those geometric shapes are each determined as a setting portion in the priority order of solid, face, line segment, and point, thus the setting portion is easily identified.

As in the processing of step S25, the definition of the geometric shape is made changeable, thereby making it possible to set the setting portion for an analysis condition with a high degree of freedom regardless of the definition of the geometric shape of the original article.

As illustrated in FIG. 2, the auxiliary geometric shapes 16a to 16d are displayed on the display 24a, thereby making it easy to recognize a location where an analysis condition is set, and mistake in setting may be avoided.

As described above, it is possible to implement the above-mentioned details of the processing by causing the information processing device 20 to execute a program.

A program may be recorded on a computer-readable recording medium (for instance, the recording medium 26a). For instance, a magnetic disk, an optical disc, a magneto-optical disk, and a semiconductor memory may be used as the recording medium. The magnetic disk includes an FD and a HDD. The optical disc includes a CD, a CD-Recordable (R)/Rewritable (RW), a DVD, and a DVD-R/RW. The program may be distributed with recorded on a portable recording medium. In this case, the program may be copied from the portable recording medium to another recording medium (for instance, the HDD 23) and executed.

Although the structural analysis simulation program, the structural analysis simulation method, and the information processing device according to an aspect of the present disclosure have been described above based on the embodiments, those are merely examples, and are not intended to limit the disclosure to the embodiments described.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing therein a program for causing a computer to execute a process, the process comprising:

reading design data from a memory which stores the design data that indicates an auxiliary geometric shape and an article to be analyzed, the auxiliary geometric shape being arranged in association with a setting portion for which a condition for performing simulation for structural analysis of the article is set in advance, and being assigned identification information including the condition;

identifying the auxiliary geometric shape and the condition from the design data based on the identification information;

setting the condition for the setting portion based on the identified auxiliary geometric shape and the condition;

converting geometric shapes which define the article to a finite element model;

converting the identified set condition according to the geometric shapes of the article to a condition for nodes, elements, or element faces in the finite element model; and performing the simulation for the structural analysis of the article based on the converted geometric shapes and the converted condition, wherein if the geometric shapes of the article are changed, the simulation is performed without repeating the step of setting the condition, wherein the program causes the computer to divide, before the geometric shapes are converted into the finite element model, a first geometric shape of the article defined in the design data into a second geometric shape in contact with the auxiliary geometric shape or included in the auxiliary geometric shape, and a third geometric shape not in contact with the auxiliary geometric shape or not included in the auxiliary geometric shape, and set the condition for the second geometric shape, or the program causes the computer to set the condition for the setting portion by setting the condition for nodes, elements, or element faces in the finite element model after the geometric shapes are converted into the finite element model.

2. The non-transitory computer-readable recording medium according to claim 1, wherein the setting portion is a point, a line segment, a face, or a solid in the article, or the auxiliary geometric shape, or any combination thereof is arranged to come into contact with the setting portion or to include the setting portion.

3. The non-transitory computer-readable recording medium according to claim 1, wherein the auxiliary geometric shape is assigned information that determines a point, a line segment, a face, or a solid, or any combination thereof which is in contact with the auxiliary geometric shape and for which the condition is set, or a point, a line segment, a face, or a solid, or any combination thereof, which is included in the auxiliary geometric shape and for which the condition is set.

4. The non-transitory computer-readable recording medium according to claim 1,
wherein when a plurality of geometric shapes overall matching the auxiliary geometric shape or overall including the auxiliary geometric shape are present in the article, the program causes the computer to execute a process of determining one of the plurality of geometric shapes to be the setting portion in a priority order of solid, face, line segment, and point.

5. The non-transitory computer-readable recording medium according to claim 1,
wherein the program causes the computer to execute a process of displaying the auxiliary geometric shape on a display device.

6. A structural analysis simulation method performed by a computer, the method comprising:
reading design data from a memory which stores the design data that indicates an auxiliary geometric shape and an article, the auxiliary geometric shape being arranged in association with a setting portion for which a condition for performing simulation for structural analysis of the article is set in advance, and being assigned identification information including the condition;
identifying the auxiliary geometric shape and the condition from the design data based on the identification information;
setting the condition for the setting portion based on the identified auxiliary geometric shape and the condition;
converting geometric shapes which define the article to a finite element model;
converting the identified set condition according to the geometric shapes of the article to a condition for nodes, elements, or element faces in the finite element model; and
performing the simulation for the structural analysis of the article based on the converted geometric shapes and the converted condition,
wherein if the geometric shapes of the article are changed, the simulation is performed without repeating the step of setting the condition,
wherein
the structural analysis simulation method further comprises:
dividing, before the geometric shapes are converted into the finite element model, a first geometric shape of the article defined in the design data into a second geometric shape in contact with the auxiliary geometric shape or included in the auxiliary geometric shape, and a third geometric shape not in contact with the auxiliary geometric shape or not included in the auxiliary geometric shape; and
setting the condition for the second geometric shape, or the structural analysis simulation method further comprises:
setting the condition for the setting portion by setting the condition for nodes, elements, or element faces in the finite element model after the geometric shapes are converted into the finite element model.

7. An information processing device comprising:
a memory; and
a processor coupled to the bus memory and the processor configured to:
read design data from a memory which stores the design data that indicates an auxiliary geometric shape and an article, the auxiliary geometric shape being arranged in association with a setting portion for which a condition for performing simulation for structural analysis of the article is set in advance, and being assigned identification information including the condition;
identify the auxiliary geometric shape and the condition from the design data based on the identification information;
set the condition for the setting portion based on the identified auxiliary geometric shape and the condition;
convert geometric shapes which define the article to a finite element model;
convert the identified set condition according to the geometric shapes of the article to a condition for nodes, elements, or element faces in the finite element model; and
perform the simulation for the structural analysis of the article based on the converted geometric shapes and the converted condition,
wherein if the geometric shapes of the article are changed, the simulation is performed without repeating the step of setting the condition,
wherein
the processor is further configured to:
divide, before the geometric shapes are converted into the finite element model, a first geometric shape of the article defined in the design data into a second geometric shape in contact with the auxiliary geometric shape or included in the auxiliary geometric shape, and a third geometric shape not in contact with the auxiliary geometric shape or not included in the auxiliary geometric shape; and
set the condition for the second geometric shape, or the processor is further configured to:
set the condition for the setting portion by setting the condition for nodes, elements, or element faces in the finite element model after the geometric shapes are converted into the finite element model.

* * * * *